United States Patent
Lamb et al.

(10) Patent No.: US 7,269,992 B2
(45) Date of Patent: Sep. 18, 2007

(54) MAGNET ORIENTATION AND CALIBRATION FOR SMALL PACKAGE TURBOCHARGER SPEED SENSOR

(75) Inventors: Wayne A. Lamb, Freeport, IL (US); Lawrence E. Frazee, Freeport, IL (US); Peter A. Schelonka, Plymouth, MN (US); Joel D. Stolfus, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 253 days.

(21) Appl. No.: 11/155,203

(22) Filed: Jun. 15, 2005

(65) Prior Publication Data

US 2006/0283232 A1    Dec. 21, 2006

(51) Int. Cl.
  *G01P 21/02* (2006.01)
(52) U.S. Cl. .......................... 73/1.41; 324/202
(58) Field of Classification Search ................. 73/1.41; 324/174, 202; 702/96, FOR. 150; 29/407.1
   See application file for complete search history.

(56) References Cited

U.S. PATENT DOCUMENTS

| | | | |
|---|---|---|---|
| 4,227,372 A | 10/1980 | Kakimoto et al. | 60/602 |
| 4,571,945 A | 2/1986 | Inada et al. | 60/602 |
| 5,488,294 A | 1/1996 | Liddell et al. | |
| 5,682,095 A | 10/1997 | Mathes et al. | |
| 5,873,248 A | 2/1999 | Houtz | 60/602 |
| 5,974,801 A | 11/1999 | Houtz | 60/602 |
| 6,067,798 A | 5/2000 | Okada et al. | 60/602 |
| 6,234,149 B1 | 5/2001 | Mills et al. | 123/486 |
| 6,378,306 B2 | 4/2002 | Koelle et al. | 60/605.1 |
| 6,539,714 B1 | 4/2003 | Wang | 60/598 |
| 6,546,728 B2 | 4/2003 | Schmidt et al. | 60/602 |
| 6,651,430 B2 | 11/2003 | Meier et al. | 60/602 |
| 6,871,499 B1 | 3/2005 | Allen et al. | 60/608 |
| 6,880,337 B2 | 4/2005 | Masuda | 60/608 |
| 6,880,518 B2 | 4/2005 | Shiraishi et al. | 123/295 |
| 6,886,337 B2 | 5/2005 | Friedrich et al. | 60/614 |
| 2005/0017709 A1 | 1/2005 | Stolfus et al. | 324/174 |
| 2007/0126088 A1* | 6/2007 | Frazee et al. | 257/666 |

* cited by examiner

*Primary Examiner*—Thomas P. Noland
(74) *Attorney, Agent, or Firm*—Kermit D. Lopez; Luis M. Ortiz

(57) ABSTRACT

A method and system for orienting and calibrating a magnet for use with a speed sensor. A magnet can be mapped two or more planes thereof in order to locate the magnet accurately relative to one or more magnetoresistive elements maintained within a speed sensor housing. An optical location of the magnet with respect to the magnetoresistive element and the sensor housing can then be identified in response to mapping of the magnet. Thereafter, the magnet can be bonded to the speed sensor housing in order to implement a speed sensor thereof maintained by the speed sensor housing for use in speed detection operations.

19 Claims, 6 Drawing Sheets

MAGNET ORIENTATION AND CALIBRATION FOR SMALL PACKAGE TURBOCHARGER SPEED SENSOR

TECHNICAL FIELD

Embodiments are generally related to sensing devices and components thereof. Embodiments also relate to speed sensors. Embodiments additionally relate to turbochargers utilized in automotive systems.

BACKGROUND OF THE INVENTION

Turbochargers are utilized in engines for improving the output power of the engine by increasing the airflow charge to the cylinders to support an increased fuel charge. Turbochargers are well known devices for pressurizing intake air entering the combustion chambers of an internal combustion engine to thereby increase the efficiency and power output of the engine. In general, pressurizing the intake air increases the quantity of air entering the engine cylinders during the intake stroke, and this allows more fuel to be utilized in establishing a desired air-to-fuel ratio. Increased available engine output torque and power is thereby realized.

In a turbocharged engine, the exhaust manifold of the engine is fluidly coupled to a turbine component of the turbocharger via an exhaust conduit, and the exhaust gas flowing through the exhaust conduit causes a turbine wheel within the turbine to rotate at a rate determined by the pressure and flow rate of exhaust gas. A compressor wheel within a compressor component of the turbocharger is mechanically coupled to the turbine wheel, and is therefore rotatably driven by the turbine wheel. An inlet of the compressor receives fresh ambient air, and an outlet of the compressor is fluidly coupled to the intake manifold of the engine via an intake conduit. The rotatably driven action of the compressor wheel increases the amount of intake air supplied to the intake conduit, thereby resulting in an increased, or so-called "boost", pressure therein:

With the development of increasingly sophisticated turbocharger and related automotive components, a need has arisen for extremely small package designs for turbocharger speed sensors utilized, for example, in diesel and gasoline engines. Current turbocharger speed sensors are used chiefly in laboratory settings or in a very limited basis at the center of a turborcharger housing. Locating the speed sensor instead on the compressor housing of the turbocharger takes advantage of cooler temperatures for sensor operations. The compressor housing location means that the sensor detects the speed of the compressor wheel as it spins at high RPM in the turbocharger. Such an arrangement also means that a hole or sensor bore through the compressor housing is required for the sensor face to be in close proximity to the fins of the compressor wheel.

Because the compressor wheel and compressor housing have been machined to close precision and the compressor wheel has been properly balanced, the added sensor bore and sensor must provide for a minimal operational impact. To prevent as little disruption as possible to the compressor wheel spinning at high RPM and to the airflow in the compressor housing, the speed sensor package should be configured in as compact and small an arrangement as possible. A small speed sensor package is also desirable for mounting or installation of the sensor on smaller sized turbochargers.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for an improved speed sensor.

It is yet another aspect of the present invention to provide for a turborcharger speed sensor.

It is a further aspect of the present invention to provide for a single integrated turborcharger speed sensor package for use in turborcharger speed sensing operations.

It as an additional aspect of the present invention to provide for a method and system for orienting and calibrating compact and small turborcharger speed sensor.

The aforementioned aspects and other objectives and advantages can now be achieved as described herein. A method and system for orienting and calibrating a magnet for use with a speed sensor are disclosed. A magnet can be mapped two or more planes thereof in order to locate the magnet accurately relative to one or more magnetoresistive elements maintained within a speed sensor housing. An optical location of the magnet with respect to the magnetoresistive element and the sensor housing can then be identified in response to mapping of the magnet. Thereafter, the magnet can be bonded to the speed sensor housing in order to implement a speed sensor thereof maintained by the speed sensor housing for use in speed detection operations.

The speed sensor housing can be implemented as a thermoplastic or thermoset plastic. A thermoset channel can be configured from the speed sensor housing, wherein the magnet is bonded to the thermoset housing of the speed sensor housing. The speed sensor housing can then be integrated with a leadframe, such that the leadframe maintains the speed sensor housing, including, for example, an ASIC, one or more bead components, and a plurality of capacitors thereof. The speed sensor can be calibrated a plurality of calibration terminals integrated with the speed sensor housing. The speed sensor is preferably adapted for use as a turborcharger speed sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
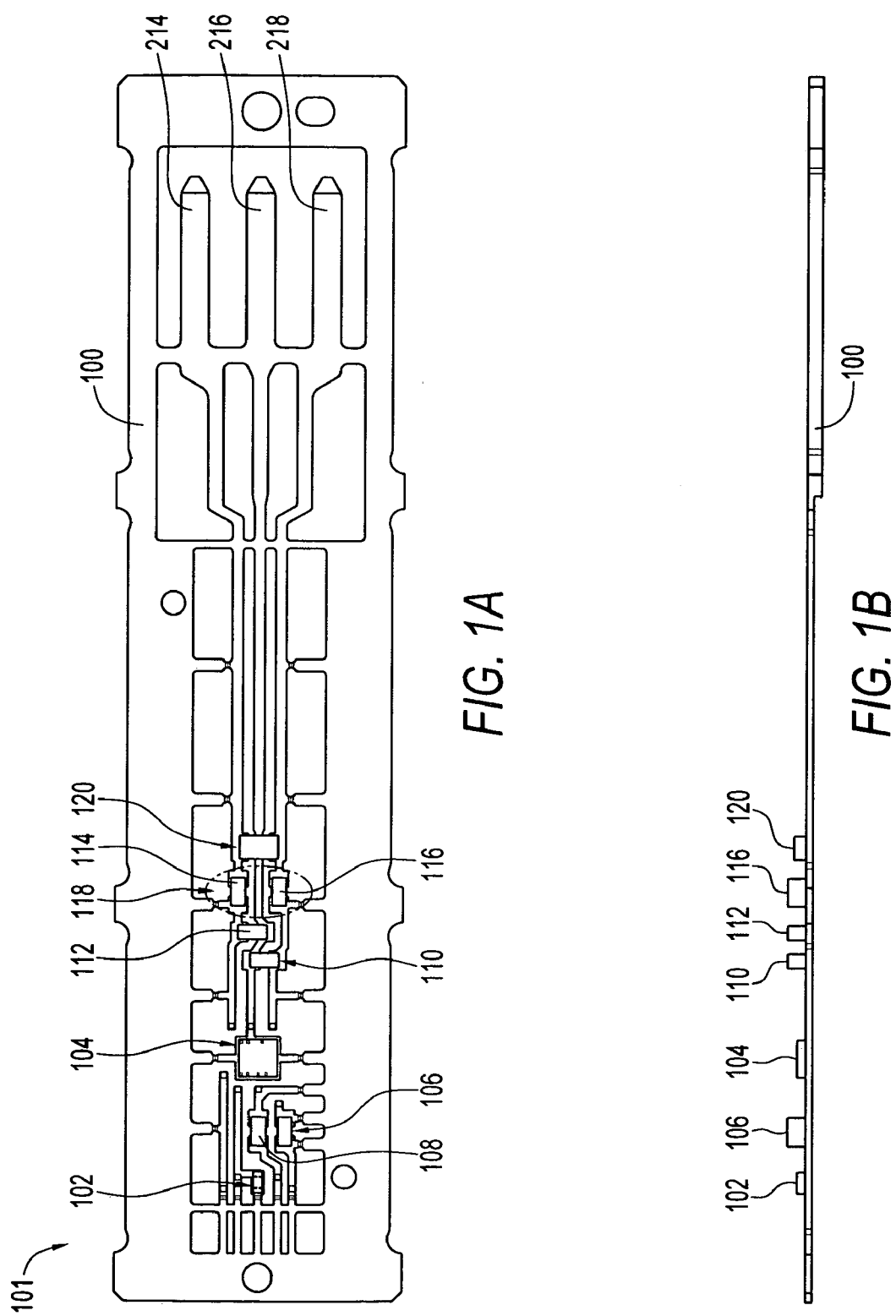
FIGS. 1A and 1B illustrate respective top and side views of a leadframe configuration, which can be implemented in accordance with a preferred embodiment.

FIGS. 1A and 1B illustrate respective top and side views 101 and 103 of a configuration for a leadframe 100, which can be implemented in accordance with a preferred embodiment. Note that in side views 101 and 103 of leadframe 100 identical or similar parts or elements are generally indicated by identical reference numerals. Leadframe 100 can thus be utilized to maintain a magnetoresistive element 102 (e.g., a GMR or AMR transducer) along with coupling capacitors 106 and 108. An ASIC 104 can also be maintained by leadframe 100 in addition to a plurality 118 of beads 114 and 116. One or more filtering capacitors 110 and 112 can also be maintained by leadframe 100. Additionally, a plurality leadframe terminals 214, 216 and 218 are featured, which are configured from leadframe 100. The foregoing components and leadframe 100 can be implemented in the context of a speed sensor utilized in association with a turbocharger.

Figure 2:
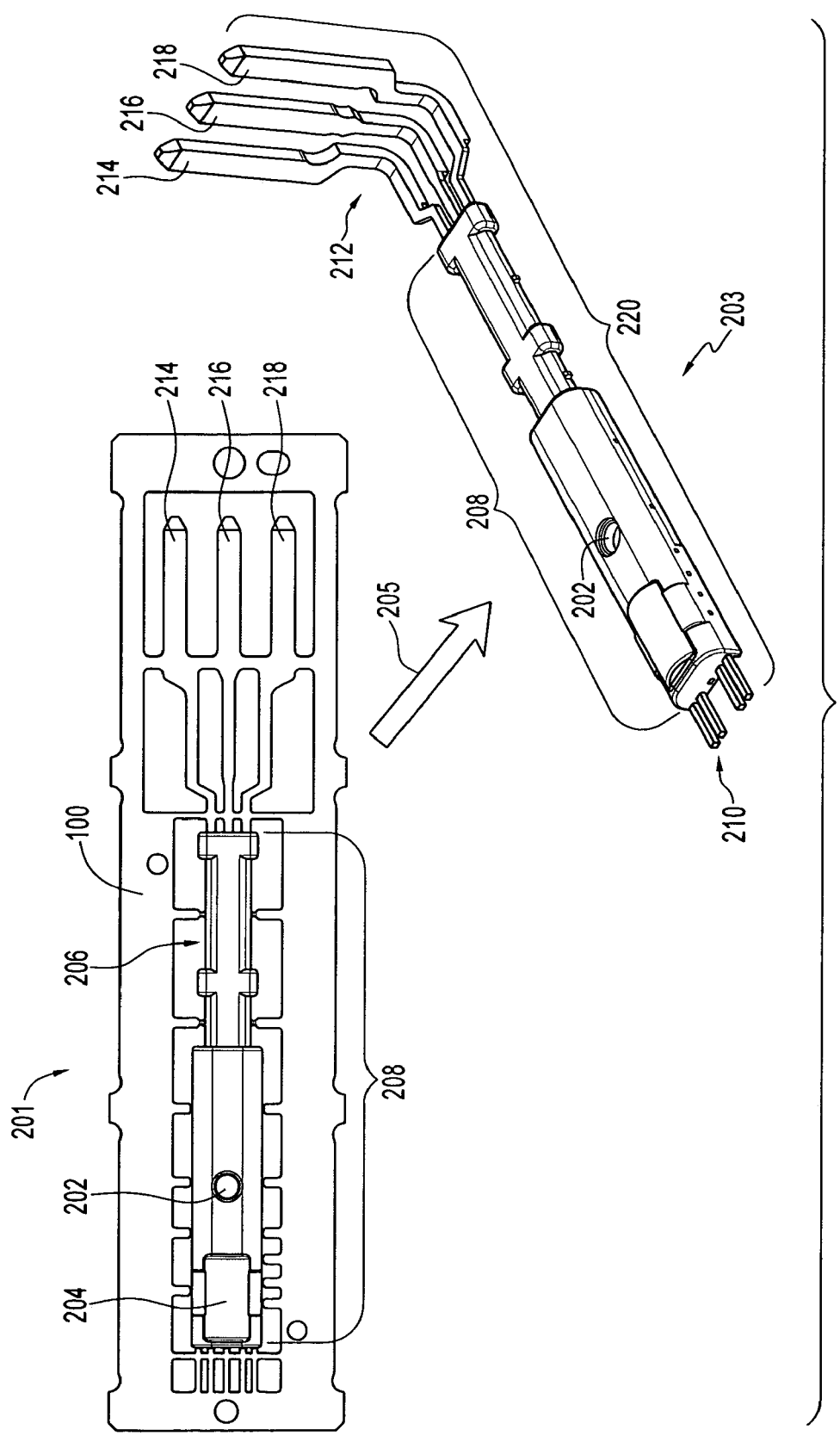
FIG. 2 illustrates a perspective view of a thermoset packaging arrangement, which can be implemented in accordance with a preferred embodiment.

FIG. 2 illustrates respective "before" and "after" perspective views 201 and 203 of a thermoset packaging arrangement, which can be implemented in accordance with a preferred embodiment. Note that in views 201 and 203, identical or similar parts or elements are indicated generally by identical reference numerals. Additionally, in FIGS. 1-2 identical or similar parts or elements are also indicated by identical reference numerals. In the "before" view 201, the leadframe 100 maintains a speed sensor housing 208, which includes plastic ribs 206, along with a location pin 202 that is utilized for thermoplastic over-molding. A protruded portion 204 is also provided by speed sensor housing 208 within which a magnet may be maintained relative to magnetoresistive component 104. Arrow 205 illustrated in FIG. 2 indicates the transition from the "before" view 201 to the "after" view 203. As depicted in the "after view" a plurality of calibration terminals 210 protrude from speed sensor housing 208, while a tie bar 212 is formed that includes terminals 214, 216 and 218. The formation of tie bar 212 is based on a 90-degree bending thereof. In general, the aforementioned components along with speed sensor housing 208 form a speed sensor 220.

Figure 3:
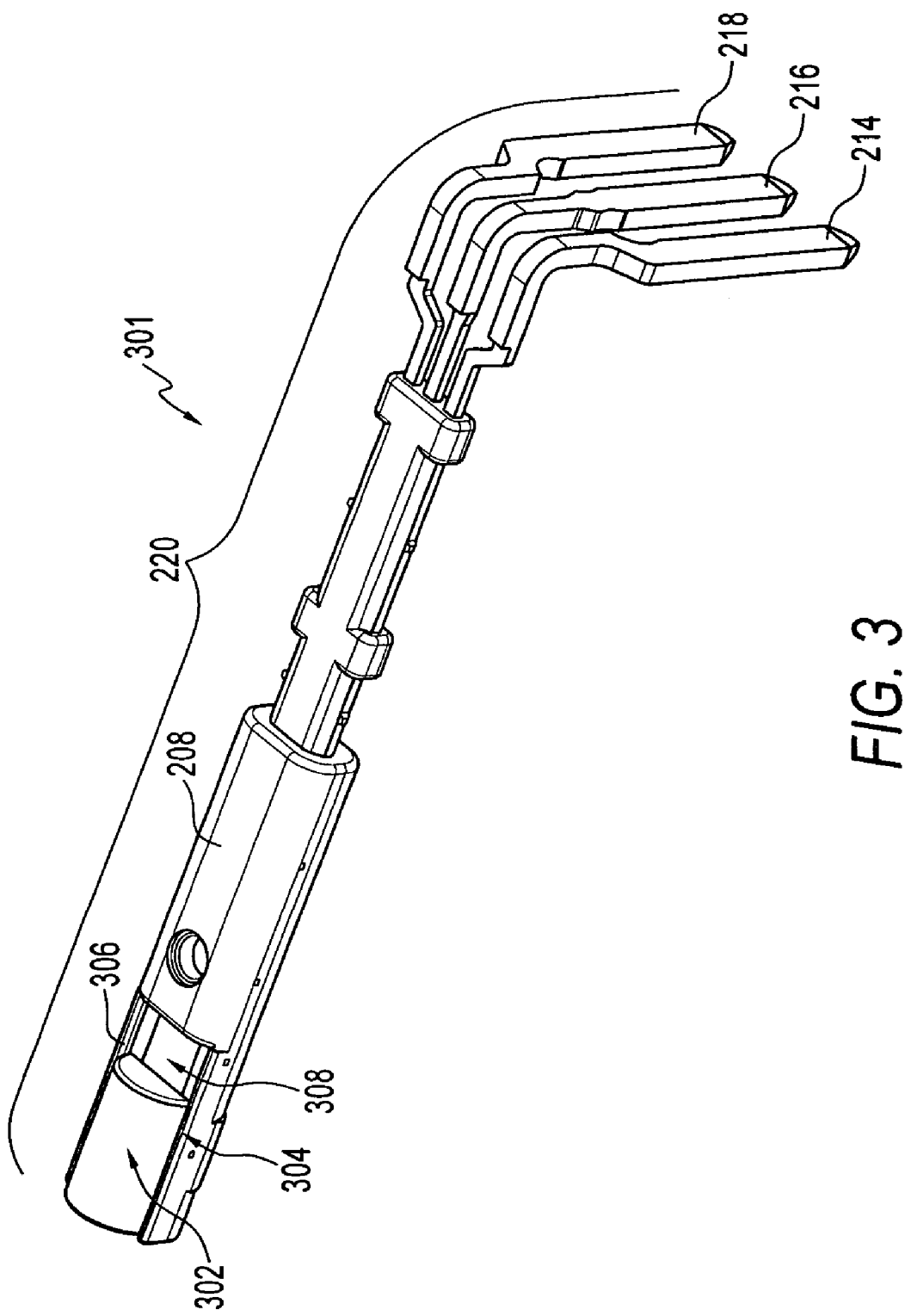
FIG. 3 illustrates a bottom perspective view of a magnet calibration configuration for calibrating a magnet, in accordance with a preferred embodiment.

FIG. 3 illustrates a bottom perspective view 301 of a magnet calibration configuration for calibrating a magnet 302, in accordance with a preferred embodiment. Note that in FIGS. 1-3, identical or similar parts or elements are generally indicated by identical reference numerals. FIG. 3 generally illustrates a calibration procedure that can be implemented for calibrating magnet 302 for orientation and placement in association with speed sensor housing 208. In general, magnet 302 can be moved until a desired magnetoresistive bridge circuit output is obtained. Plastic rails 304 and 306 can be integrated with speed sensor housing 208 in order to restrict the movement of magnet 302 perpendicular to the sensor formed from sensor housing 208. Such a speed sensor essentially incorporates speed sensor housing 208 and leadframe terminals 214, 216, and 218. The magnet 302 can be bonded to a thermoset channel 308, which is bounded by rails 304 and 306 and configured from the sensor housing 208.

Figure 4:
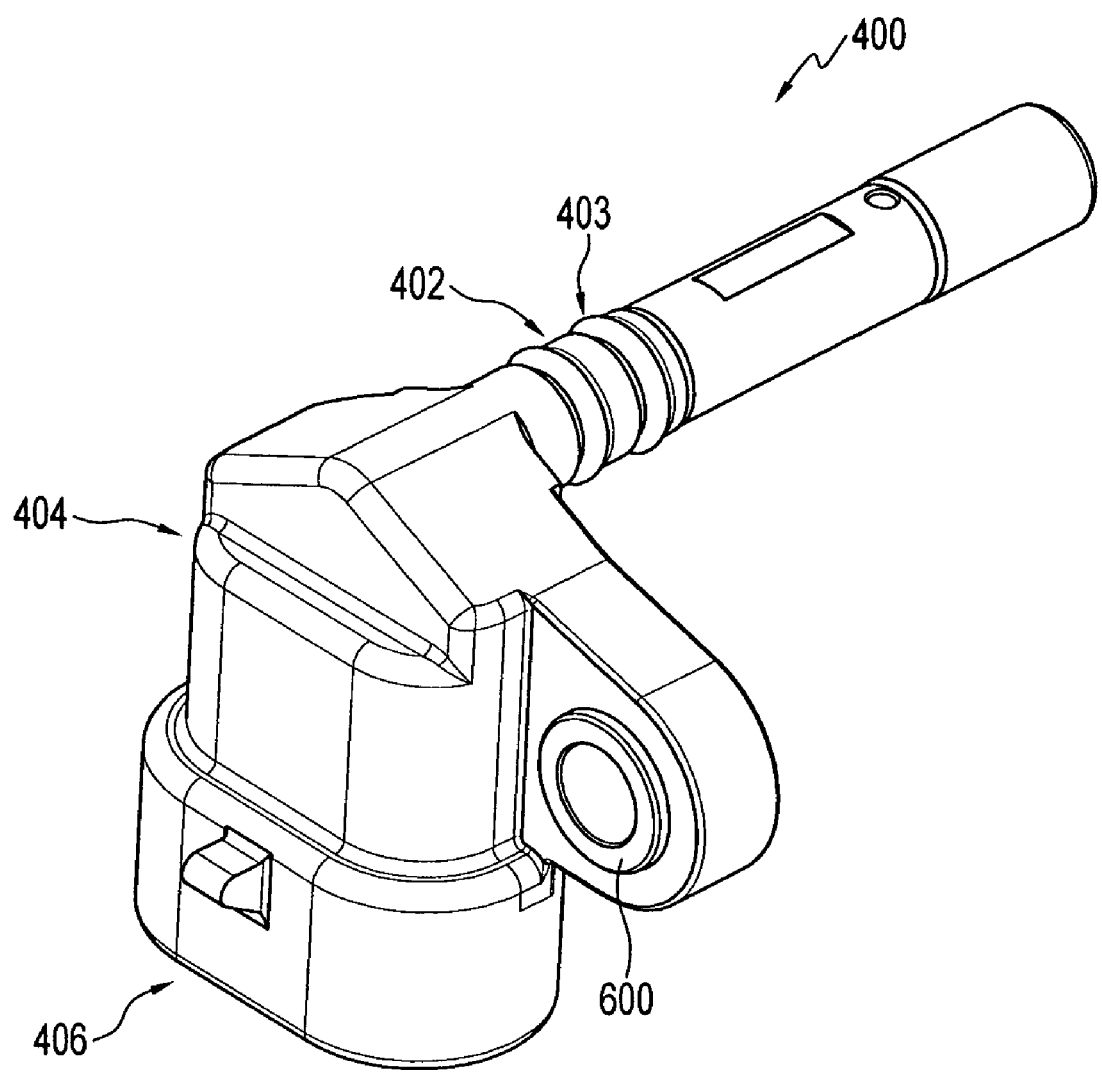
FIG. 4 illustrates a perspective view of a second level over-mold, which can be implemented for maintaining the turbocharger speed sensor in accordance with an embodiment.

FIG. 4 illustrates a perspective view of a second level over-mold 400, which can be implemented for maintaining the turbocharger speed sensor 220 in accordance with an embodiment. Note that in FIGS. 1-4, identical or similar parts or elements are generally indicated by identical reference numerals. The over-mold 200 can be implemented with one or more O-rings 403 and a thermoplastic component 404. A connecting mechanism or component 406 can also be provided in association with a machined bushing 600, which is shown in greater detail herein with respect to FIG. 6. The second level over-mold depicted in FIG. 4 generally surrounds and encases the sensor 220 depicted previously herein with respect to FIGS. 1-3. Over-mold 400 thus forms the general outlines of an enhanced speed sensor thereof, which is maintained within and by over-mold 400. Thus, reference numeral 400 depicted in FIG. 4 can be utilized not only to refer the over-mold thereof but also to the speed sensor, which incorporates speed sensor 220 described earlier.

Figure 6:
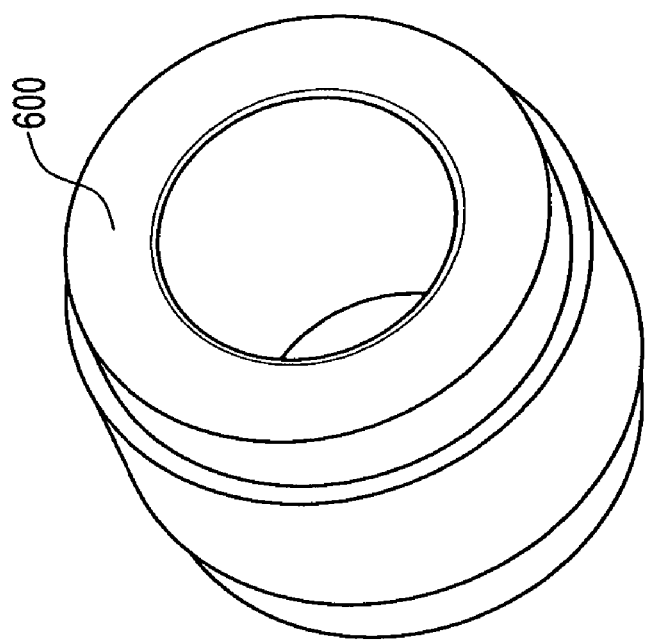
FIG. 6 illustrates a machined bushing, which can be implemented in accordance with an embodiment.
Figure 5:
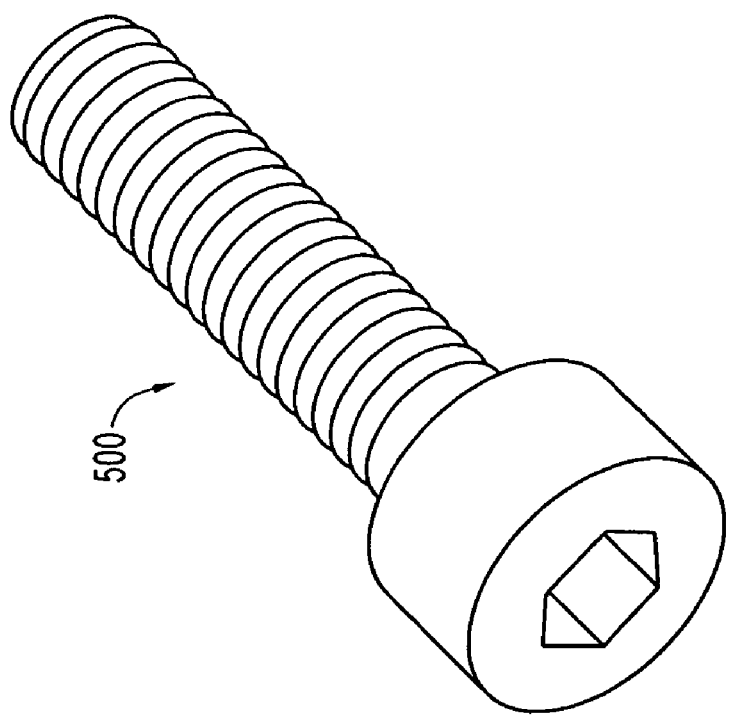
FIG. 5 illustrates a mounting bolt, which can be implemented in accordance with an embodiment.
Figure 7:
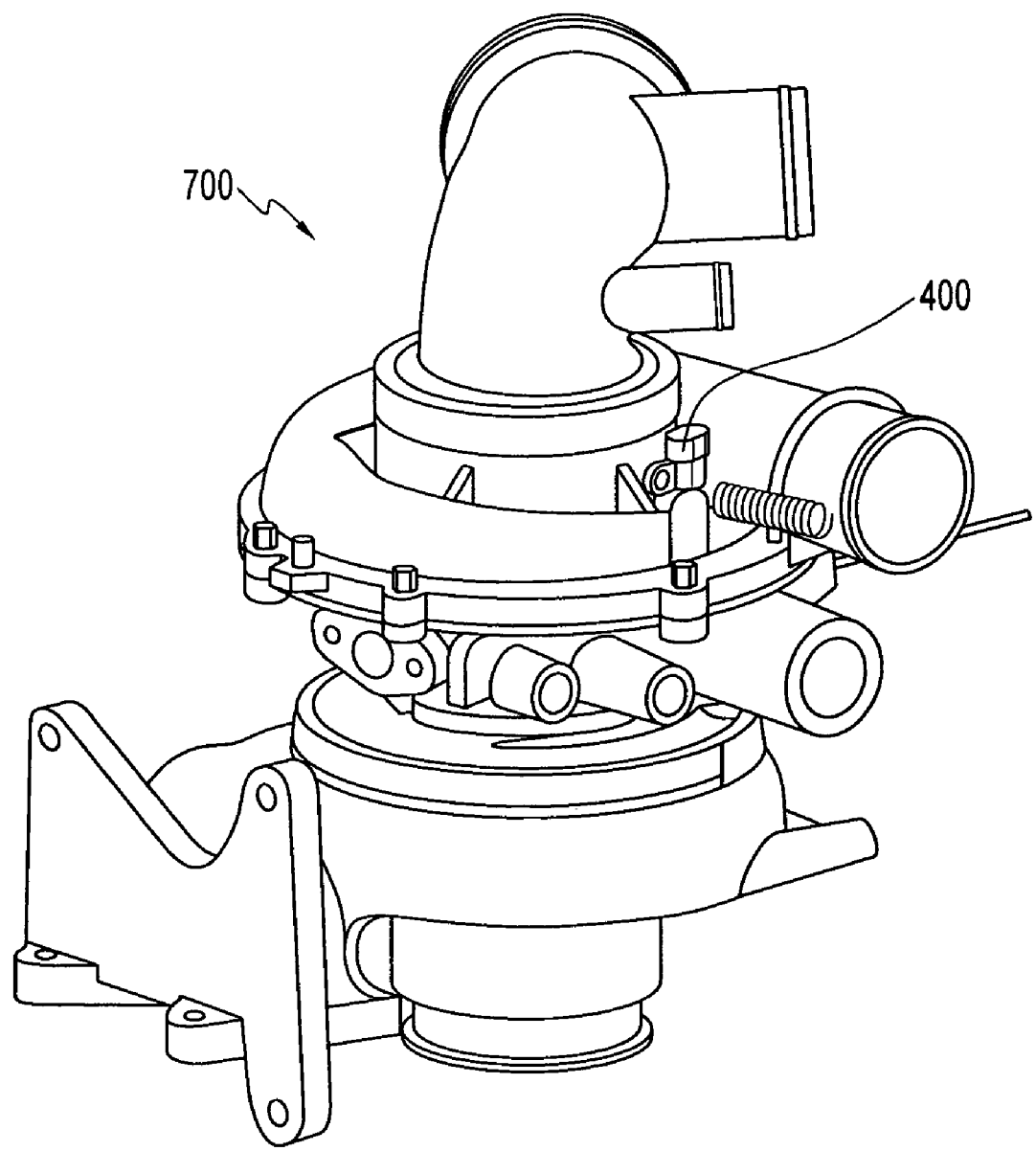
FIG. 7 illustrates a perspective view of a sensor installed in a turbocharger, in accordance with an embodiment.

FIG. 5 illustrates a mounting bolt 500, which can be implemented in accordance the embodiment depicted in FIG. 4. Similarly, FIG. 6 illustrates the machined bushing 600, which can be implemented in accordance with the embodiment of FIG. 4. The mounting bolt 500 can be provided with a thread lock feature, while the machined bushing 500 can be configured from brass, depending upon design considerations. FIG. 7 illustrates a perspective view of sensor 400 installed in a turbocharger 700, in accordance with an embodiment.

Note that the size, orientation and position of magnet 302 are important for the small sensor construction and performance required for turbocharger speed sensor applications. Due to the limited space and packaging constraints, a half cylinder shaped magnet can be utilized for magnet 302, which can fit within a small diameter and provide as much surface area as possible for signal strength. The magnetoresistive (MR) sensing element 102 depicted in FIGS. 1A-1B, for example, is generally sensitive to magnet 302 movement in two planes. Therefore, to achieve an optimal signal strength, the calibration procedure described herein can be accomplished in order to place the magnet 302 in a "sweet" spot for maximum sensor performance. Magnet 302 can be attached to the speed sensor housing 208 (i.e., a thermoset package), which contains the MR sensing element 102 by using a UV curable epoxy until final package over-molding occurs.

In order to the find the so-called "sweet" spot for optimal performance, a mapping procedure can be accomplished, which very accurately locates the magnet 302 relative to the MR sensing element 102. The magnet 302 and mating thermoset package (e.g., sensor housing 208) can then be fixtured and the magnet 302 moved away from the thermoset package and the magnet 302 moved very accurately in two planes using a mapper with stepper motor controls. The mapping can be accomplished with the magnet 302 containing the full potential travel of the magnet 302 on the sensor housing 208 or thermoset package thereof.

Resulting data can then be analyzed to determine the optimal "sweet" spot. The magnet 302 can then be moved away from the sensor housing 208 or thermoset package and a drop of UV curable epoxy placed on the thermoset package. The magnet 302 can then be moved back to the thermoset package, displacing the epoxy and creating a thin layer of epoxy between the magnet 302 and the thermoset package or housing 208. A UV light can then be utilized to temporarily lock the magnet in place. A batch cure can later be utilized to final cure the epoxy prior to thermoplastic over-molding.

A number of advantages can result from implementing the embodiments discussed herein. For example the cooler temperatures of approximately 190° C., for example, on the compressor housing side of the turbocharger allow all of the integrated circuits (IC's) and signal-conditioning electronics to be packaged together and over-molded with a thermoplastic into a single package with integral connectors. This eliminates the need for a so-called "pigtail" or wire-harness version of the sensor to remotely locate the electrical components. A single integrated package as described herein can therefore reduce the number of components required along with associated material costs and manufacturing processes that may be needed in a "pigtail" version. The use of an integral connector, for example, allows for enhanced sealing by eliminating multiple interconnects that are utilized in conventional "pigtail" versions.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for orienting and calibrating a magnet for use with a speed sensor:
    mapping a magnet in at least two planes thereof in order to locate said magnet accurately relative to at least one magnetoresistive element maintained within a speed sensor housing;
    identifying an optimal location of said magnet with respect to said at least one magnetoresistive element and said sensor housing in response to mapping said magnet; and
    thereafter bonding said magnet to said speed sensor housing in order to implement a speed sensor thereof maintained by said speed sensor housing for use in speed detection operations.

2. The method of claim 1 wherein said speed sensor housing comprises a thermoplastic package.

3. The method of claim 1 further comprising:
    forming a thermoset channel from said speed sensor housing, wherein said magnet is bonded to said thermoset housing of said speed sensor housing.

4. The method of claim 1 further comprising:
    integrating said speed sensor housing with a leadframe, wherein said lead frame maintains said speed sensor housing, including at least one ASIC, a plurality of bead components, and a plurality of capacitors thereof.

5. The method of claim 1 further comprising:
    calibrating said speed sensor utilizing a plurality of calibration terminals integrated with said speed sensor housing.

6. The method of claim 1 further comprising:
    adapting said speed sensor for use with a turbocharger.

7. The method of claim 6 wherein further comprising:
    providing said speed sensor housing with an integral connector for connecting said speed sensor to said turbocharger.

8. The method of claim 1 wherein said at least one magnetoresistive component comprises an anisotropic magnetoresistive (AMR) transducer.

9. The method of claim 1 wherein said at least one magnetoresistive component comprises a giant magnetoresistive (GMR) transducer.

10. A method for orienting and calibrating a magnet for use with a speed sensor:
    mapping a magnet in at least two planes thereof in order to locate said magnet accurately relative to at least one magnetoresistive element maintained within a speed sensor housing, wherein said speed sensor housing comprises a thermoplastic package;
    identifying an optimal location of said magnet with respect to said at least one magnetoresistive element and said sensor housing in response to mapping said magnet;
    bonding said magnet to said speed sensor housing in order to implement a speed sensor thereof maintained by said speed sensor housing for use in speed detection operations; and
    forming a thermoset channel from said speed sensor housing, wherein said magnet is bonded to said thermoset housing of said speed sensor housing.

11. The method of claim 10 further comprising:
    integrating said speed sensor housing with a leadframe, wherein said lead frame maintains said speed sensor housing, including at least one ASIC, a plurality of bead components, and a plurality of capacitors thereof.

12. The method of claim 10 further comprising:
    calibrating said speed sensor utilizing a plurality of calibration terminals integrated with said speed sensor housing.

13. The method of claim 10 further comprising:
    adapting said speed sensor for use with a turbocharger.

14. The method of claim 13 wherein further comprising:
    providing said speed sensor housing with an integral connector for connecting said speed sensor to said turbocharger.

15. The method of claim 10 wherein said at least one magnetoresistive component comprises an anisotropic magnetoresistive (AMR) transducer.

16. The method of claim 10 wherein said at least one magnetoresistive component comprises a giant magnetoresistive (GMR) transducer.

17. A method for orienting and calibrating a magnet for use with a speed sensor:
    mapping a magnet in at least two planes thereof in order to locate said magnet accurately relative to at least one magnetoresistive element maintained within a speed sensor housing, wherein said speed sensor housing comprises a thermoplastic package;
    identifying an optimal location of said magnet with respect to said at least one magnetoresistive element and said sensor housing in response to mapping said magnet;
    bonding said magnet to said speed sensor housing in order to implement a speed sensor thereof maintained by said speed sensor housing for use in speed detection operations;
    forming a thermoset channel from said speed sensor housing, wherein said magnet is bonded to said thermoset housing of said speed sensor housing; and
    integrating said speed sensor housing with a leadframe, wherein said lead frame maintains said speed sensor housing, including at least one ASIC, a plurality of bead components, and a plurality of capacitors thereof.

18. The method of claim 17 further comprising:
    calibrating said speed sensor utilizing a plurality of calibration terminals integrated with said speed sensor housing.

19. The method of claim 17 further comprising:
    adapting said speed sensor for use with a turbocharger; and
    providing said speed sensor housing with an integral connector for connecting said speed sensor to said turbocharger.

* * * * *